United States Patent [19]
Findeisen et al.

[11] Patent Number: 5,089,182
[45] Date of Patent: Feb. 18, 1992

[54] PROCESS OF MANUFACTURING CAST TUNGSTEN CARBIDE SPHERES

[76] Inventors: Eberhard Findeisen; Klaus Frank; Wilfried Becker; Fritz Müller, all of WOKA Schweisstechnik GmbH, P.O. Box 12 17, 4156 Willich 1, Fed. Rep. of Germany

[21] Appl. No.: 421,670

[22] Filed: Oct. 16, 1989

[30] Foreign Application Priority Data

Oct. 15, 1988 [DE] Fed. Rep. of Germany ....... 3835234

[51] Int. Cl.⁵ ............................ B29B 9/10; B22F 9/04
[52] U.S. Cl. ................................................ 264/8; 425/8
[58] Field of Search .................. 264/8; 425/8; 75/334; 423/53, 440

[56] References Cited

U.S. PATENT DOCUMENTS

| | | | |
|---|---|---|---|
| 2,439,772 | 4/1948 | Gow | 264/8 |
| 3,346,673 | 10/1967 | Last et al. | 264/8 |
| 3,660,544 | 5/1972 | Young et al. | 264/8 |
| 4,358,415 | 11/1982 | Tachimoto et al. | 264/8 |
| 4,374,074 | 2/1983 | Ueda et al. | 264/8 |
| 4,687,510 | 8/1987 | Cheney et al. | 264/8 X |
| 4,701,289 | 10/1987 | Liles et al. | 264/8 |

FOREIGN PATENT DOCUMENTS 3608693 10/1987 Fed. Rep. of Germany.

Primary Examiner—Mary Lynn Theisen

[57] ABSTRACT

To develop a process for manufacturing cast tungsten carbide spheres, without any content of spattering material, as solid spheres with a bulk weight of 0.5-11.5 g/cm³ for cast tungsten carbide spheres from a screen fraction, and with a granular distribution of 40 μm to 2,000 μm, tungsten carbide is heated to about 150°-300° C. above the melting point, and then the cast tungsten carbide is smelted and granulated in stationary inert gas.

13 Claims, 1 Drawing Sheet

PROCESS OF MANUFACTURING CAST TUNGSTEN CARBIDE SPHERES

FIELD OF THE INVENTION

The invention concerns cast tungsten carbide spheres as well as a process for their manufacture.

DESCRIPTION OF THE PRIOR ART

A process for the manufacture of cast tungsten carbide is known from DE-3608683-A1, in which a mixture of stochiometrically weighed tungsten powder and carbon consisting of graphite powder is molten in an arc under inert gas, and this molten compound is granulated on a rotating surface. With this process, spherical cast tungsten carbide is obtained, which still has a content of spattering material with a non-spherical surface. When coating a surface with cast tungsten carbide, this proportion of spattering, non-spherical material produces sectors in the surface coating, which under strain leads to cracking of the surface coating.

BRIEF SUMMARY OF THE INVENTION

The task therefore was to develop a process for manufacturing cast tungsten carbide spheres, without any content of spattering material, as solid spheres with a bulk weight of 9.5–11.5 g/cm$^3$ for cast tungsten carbide spheres from one screen fraction, and with a granular distribution of 40 µm to 2,000 µm. Surprisingly, the task was solved by heating the cast tungsten carbide to about 150°–300° C. above the melting point, and then smelting and granulating the cast tungsten carbide in stationary inert gas.

The process according to the invention can also be preferably characterized by
 a. a turntable with concave surface being used as a cooled casting surface.
 b. carbon black being used as the carbon.
 c. acetylene black being used as the carbon black, which is produced through the pyrolysis of ethyne.
 d. rare gas being used as the inert gas.
 e. operating at an underpressure of 0.5–0.9 bar.
 f. operating at an underpressure of 0.8–0.85 bar.
 g. using as the rotating cooled surface a water-cooled sphere.
 h. selecting a velocity of 50–600 rpm for the rotating, cooled surface.
 i. using a water-cooled revolving pipe, and the molten cast tungsten carbide falling freely as a jet in the revolving pipe.
 j. selecting a velocity of 10–60 rpm for the water-cooled revolving pipe.
 k. removing the solidified tungsten carbide spheres continuously via a lock from the melting device.

With the process according to the invention it is now possible to obtain the cast tungsten carbide spheres as solid spheres with a bulk weight of 9.5–11.5 g/cm$^3$. The cast tungsten carbide spheres are also characterized by the lack of any spattering ratios. The bulk weight is determined on solid spheres from one screen fraction, e.g. 45–125 µm, 200–315 µm or 800–1,000 µm, which have been screened from the total produced granular range. Preferably, the cast tungsten carbide spheres have a bulk weight of 9.9–10.5 g/cm$^3$.

According to the invention, the flow capacity of the cast tungsten carbide spheres, expressed as Hall Flow amounts to 2–6 sec./50 g for screen fractions smaller than 315 µm.

BRIEF DESCRIPTION OF THE DRAWING

In the accompanying Drawing.

DETAILED DESCRIPTION

One advantage of the invention is in the use of carbon black as the reactant, with which an energy saving of up to about 10% is achieved during melting of the cast tungsten carbide, whilst when using acetylene black as the reactant, an energy saving of some 20% is achieved when melting the cast tungsten carbide.

The products of the invention consist essentially of solid cast tungsten carbide spheres without a spattering ratio. The graunular distribution is between 40 µm and 2,000 µm.

An additional advantage of the invention is derived from the products being more rapidly meterable due to their spherical nature during surface coating, which ensures a uniformly thick surface coating with high "pack density" with no cracking occurring in the surface of the coating.

Due to the solid spherical shape and the lack of a spattering ratio in the cast tungsten carbide according to the invention, no change occurs in the matrix in which the cast tungsten carbide is embedded.

Figure 1:
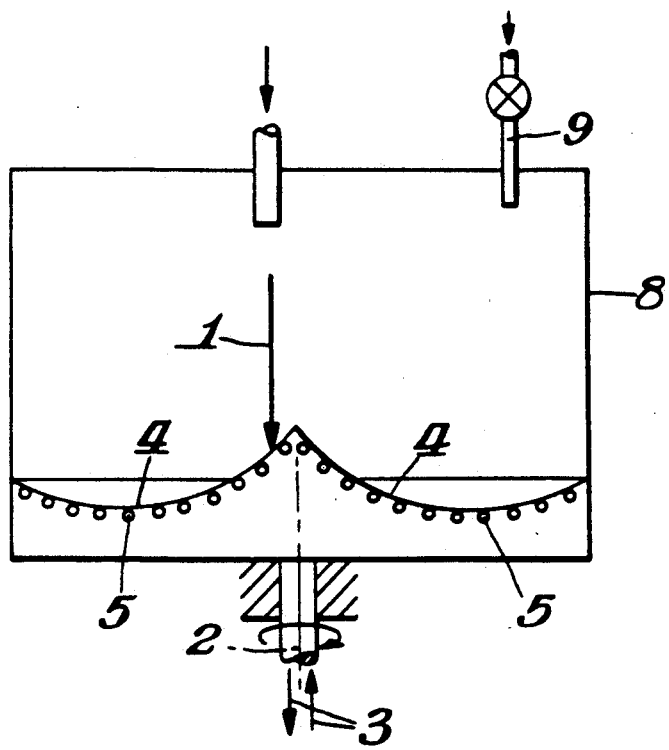
FIG. 1 is a cross-sectional view of one embodiment of a cooled (concave-shaped) turntable providing a rotating cooled surface useful in granulating tungsten carbide according to this invention.
Figure 2:
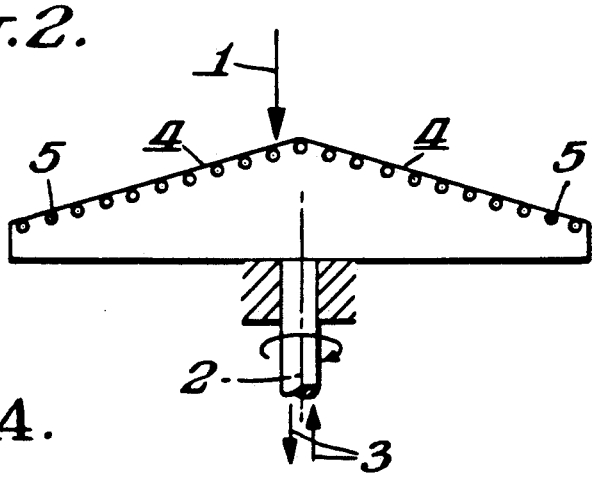
FIG. 2 is a cross-sectional view of an alternative type of turntable.
Figure 3A:
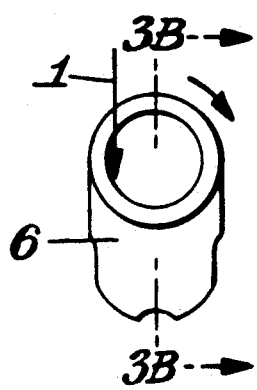
FIG. 3A is an end elevational view of a cooled revolving pipe useful in granulating tungsten carbide according to this invention.
Figure 3B:
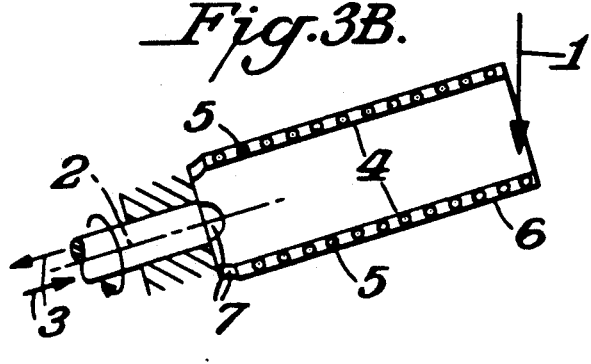
FIG. 3B is a cross-sectional view taken along line 3B—3B of FIG. 3A.

The reference numerals indicate like parts, aspects, or features of the four Figures illustrating the cooling turntable or revolving rotatable pipe embodiments of devices used in the method of this invention to granulate molten tungsten carbide. These parts of these various embodiments include the stream from the casting jet 1, the rotational axis 2 of the device (turntable or pipe), the inlet and outlet 3 for the water coolant, the cooling surfaces 4, channels or conduits 5 of a cooling manifold for water cooling of the cooling surfaces 4, the rotatable cylinder or pipe 6 (FIGS. 3A and 3B), the outlet openings 7 of the rotatable pipe 6 (FIGS. 3A and 3B), a housing 8 for containing the stationary inert gas (shown in FIG. 1, not shown in FIGS. 2 and 3), and means 9 for introducing the stationary inert gas (FIG. 1, not shown in FIGS. 2 and 3).

Thus, the stream 1 is directed onto the cooling surface 4, and the cooling surface is rotating due to rotational movement about axis 2. Surfaces 4 are cooled by water entering through inlet/outlet 3; the water is the conveyed to the conduits 5 of the cooling manifold by a suitable means (not shown), and the water circulated through conduits 5 is collected by collecting means (not shown) so that it can leave through outlet 3. Essentially this same system is utilized in revolving rotatable pipe 6 (FIGS. 3A and 3B) as well as the turntables of FIGS. 1 and 2.

The invention is explained and illustrated further by the following Examples:

EXAMPLE 1.

19.2 kg tungsten powder is ground and homogenously mixed with 0.8 kg graphite powder in a pan crusher. This raw material mixture was then continuously supplied to a water-cooled copper furnace crucible. The raw material mixture was melted in this water-cooled copper crucible using an arc, producing molten cast tungsten carbide.

This fluid melt was then heated to 2,950° C. From the crucible the fluid cast tungsten carbide was then poured in a thin jet (dia. about 2 mm) onto a water-cooled turntable (dia. about 35 cm) with a concave shaped surface, rotating at 400 rpm.

From the rotating turntable, the cast tungsten carbide spheres fell freely onto the water-cooled base of the furnace housing. The complete furnace housing was flooded with argon as the inert gas.

The cast tungsten carbide spheres produced in a granular range of 40 $\mu$m to 600 $\mu$m, were continuously removed from the furnace housing via a lock.

The raw material was supplied at a rate of 5.55 g/sec. (20 kg/h); the power consumption was 2 kWh/kg cast tungsten carbide. The cast tungsten carbide spheres had a bulk weight of 10.3 g/cm$^3$ with a sphere diameter of 45–125 $\mu$m.

EXAMPLE 2

In this example, 19.2 kg tungsten powder and 0.8 kg carbon black were processed. The fluid cast tungsten carbide at a temperature of 2,980° C. was poured in a thin jet (dia. about 1.8 mm) onto a water-cooled turntable with a concave shaped surface, rotating at 500 rpm. From this rotating turntable, the cast tungsten carbide spheres fell freely onto the water-cooled base of the furnace housing. The complete furnace housing was flooded with argon as the inert gas. The cast tungsten carbide spheres produced in a granular range of 40 $\mu$m to 400 $\mu$m, were continuously removed from the furnace housing via a lock. The raw material was supplied at a rate of 5.55 g/sec. (20 kg/h); the power consumption now amounted to 1.9 kWh/kg cast tungsten carbide.

As in Example 1, the granulated cast tungsten carbide spheres had a bulk weight of 10.5 g/cm$^3$ with a sphere diameter of 45–125 $\mu$m.

EXAMPLE 3

19.2 kg tungsten powder and 0.8 kg acetylene black were processed as specified in Example 1.

The fluid cast tungsten carbide at a temperature of 3,000° C. was poured in a thin jet (dia. about 2.5 mm) onto a water-cooled casting cone with an opening angle of 30°. The rotating casting cone rotated at 300 rpm.

The complete furnace housing was flooded with argon as the inert gas. The cast tungsten carbide spheres produced in a granular range of 200 $\mu$m to 800 $\mu$m, were continuously removed from the furnace housing via a lock.

The raw material was supplied at a rate of 5.55 g/sec. (20 kg/h). The power consumption now amounted to 1.8 kWh/kg cast tungsten carbide. The granulated cast tungsten carbide spheres had a bulk weight of 9.9 g/cm$^3$ with a sphere diameter of 200–315 $\mu$m.

EXAMPLE 4

Example 2 was repeated.

The fluid cast tungsten carbide at a temperature of 3,000° C. was poured from the crucible in a thin jet (dia. about 2.5 mm) onto a rotating, water-cooled casting cone with an opening angle of 30°. The rotating casting cone revolved at 180 rpm. The complete furnace housing was flooded with argon as the inert gas. The cast tungsten carbide spheres produced in a granular range of 400 $\mu$m to 1,000 $\mu$m, were continuously removed from the furnace housing via a lock.

During this trial, after the air had been replaced in the furnace housing, including the supplying device with a filling of argon as the inert gas, the gas pressure in the furnace was lowered to 0.85 bar, and this reduced argon pressure was maintained throughout the complete melting process.

The raw material was supplied at a rate of 5.55 g/sec. (20 kg/h). The power consumption was 1.88 kWh/kg cast tungsten carbide.

The cast tungsten carbide spheres had a bulk weight of 10.1 g/cm$^3$ with a sphere diameter of 800–1,000 $\mu$m.

EXAMPLE 5

Example 3 was repeated.

The fluid cast tungsten carbide at a temperature of 2,900° C. was poured from the crucible in a thin jet (dia. about 3.0 mm) into the water-cooled revolving pipe. The rotating pipe had a clear diameter of 35 cm with a length of 80 cm and a horizontal deviation of 10°. The revolving pipe had a rotational speed of 30 rpm.

The complete furnace housing was flooded with argon as the inert gas. The cast tungsten carbide spheres produced in a granular range of 800 $\mu$m to 2,000 $\mu$m, were continuously removed from the furnace housing via a lock.

The raw material was supplied at a rate of 11 g/sec. (40 kg/h). The power consumption was 1.8 kWh/kg cast tungsten carbide. The cast tungsten carbide spheres had a bulk weight of 9.6 g/cm$^3$ with a sphere diameter of 800–1,000 $\mu$m.

What is claimed is:

1. Process for manufacturing cast tungsten carbide spheres with a granular distribution of 40 $\mu$m to 2,000 $\mu$m, in which cast tungsten carbide is melted from tungsten powder and carbon in a carbon-free crucible under inert gas by an arc, with the molten cast tungsten carbide being granulated under inert gas using a rotating cooled surface, wherein the cast tungsten carbide is heated to about 150°–300° C. above the melting point, with the cast tungsten carbide being melted and granulated under stationary inert gas.

2. Process according to claim 1, wherein a turntable with a concave shaped surface is used as the rotating cooled surface.

3. Process according to claim 1, wherein carbon black is used as the carbon.

4. Process according to claim 3, wherein the carbon black used consists of acetylene black which is obtained from the pyrolysis of ethyne.

5. Process according to claim 1, wherein rare gas is used as the inert gas.

6. Process according to claim 1, wherein an underpressure of 0.5–0.9 bar is used.

7. Process according to claim 1, wherein an underpressure of 0.8–0.85 bar is used.

8. Process according to claim 1, wherein a water-cooled cone is used as the rotating cooled surface.

9. Process according to claim 1, wherein the speed of rotation of the rotating, cooled surface is 50–600 rpm.

10. Process according to claim 1, wherein a water-cooled revolving pipe is used to provide the rotating cooled surface, and the molten cast tungsten carbide falls freely as a jet into the revolving pipe.

11. Process according to claim 10, wherein the speed of rotation of the water-cooled revolving pipe is 10-60 rpm.

12. Process according to claim 1, wherein removal of the molten cast tungsten carbide spheres following solidification takes place continuously from the granulting zone.

13. Process for manufacturing cast tungsten carbide spheres with a granular distribution of 40 $\mu$m to 2,000 $\mu$m, comprising:

melting tungsten carbide obtained from tungsten powder and carbon in a carbon-free crucible under inert gas by an arc, heating the cast tungsten carbide to 150°-300° C. above the melting point and casting the molten tungsten carbide onto a rotating cooled surface to granulate it, wherein the tungsten carbide is melted and granulated under stationary inert gas.

* * * * *